(12) United States Patent
Carrico et al.

(10) Patent No.: US 10,514,707 B1
(45) Date of Patent: Dec. 24, 2019

(54) FLIGHT PHASE STABILITY INDICATOR SYSTEM AND METHOD

(71) Applicants: ROCKWELL COLLINS, INC.; Lori Talbott, Fairfax, IA (US)

(72) Inventors: Matthew J. Carrico, Mt. Vernon, IA (US); Lori J. Sipper, Robins, IA (US); Madhu S. Niraula, Cedar Rapids, IA (US); Kimm M. Epperson, Springville, IA (US); Curtis W. Talbott, Cedar Rapids, IA (US); Douglas A. Bell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 480 days.

(21) Appl. No.: 14/315,575

(22) Filed: Jun. 26, 2014

(51) Int. Cl.
*G05D 1/06* (2006.01)
*B64D 17/00* (2006.01)

(52) U.S. Cl.
CPC ........... *G05D 1/0676* (2013.01); *B64D 17/00* (2013.01); *G05D 1/0684* (2013.01)

(58) Field of Classification Search
CPC ....... B64D 17/00; G05D 1/105; G05D 1/0684
USPC .......................................................... 701/16
See application file for complete search history.

(56) References Cited

U.S. PATENT DOCUMENTS

| | | | | |
|---|---|---|---|---|
| 7,026,956 B1* | 4/2006 | Wenger | .............. | G01C 23/00 340/945 |
| 8,193,948 B1* | 6/2012 | Shapiro | .............. | G08G 5/065 340/945 |
| 8,217,807 B1 | 7/2012 | Carrico | | |
| 8,493,240 B1 | 7/2013 | Carrico | | |
| 8,751,512 B2* | 6/2014 | Deleris | .............. | G08G 5/0021 701/26 |
| 2001/0056316 A1* | 12/2001 | Johnson | .............. | G01C 5/005 701/14 |
| 2007/0067093 A1* | 3/2007 | Pepitone | .............. | G01C 23/005 701/120 |
| 2009/0043434 A1* | 2/2009 | Deker | .............. | G05D 1/0676 701/16 |
| 2012/0035849 A1* | 2/2012 | Clark | .............. | G01C 23/00 701/467 |
| 2014/0114506 A1* | 4/2014 | Puyou | .............. | G08G 5/025 701/18 |
| 2014/0277857 A1* | 9/2014 | Bourret | .............. | G08G 5/025 701/17 |

* cited by examiner

*Primary Examiner* — Jacob S. Scott
*Assistant Examiner* — Michael E Butler
(74) *Attorney, Agent, or Firm* — Daniel M. Barbieri; Donna P. Suchy; Angel N. Gerdzhikov

(57) ABSTRACT

A flight phase stability indicator system and method for generating and presenting stability indicator(s) are disclosed. A processor receives flight phase data representative of an identification of a current operational flight phase; receives navigation data comprised of aircraft position, a planned flight trajectory, and runway data if runway data is needed for the current operational flight phase; determines stability data representative of a stability of the current operational flight phase based upon at least the navigation data; generates presentation data responsive to the determination and representative of the flight phase stability indicator and/or presentation(s) of flight phase stability; and presents the indicator represented in the presentation data on or through a presentation unit comprised of a visual display, aural advisory unit, and/or tactile advisory unit.

16 Claims, 10 Drawing Sheets

| Vertical Deviations | | | | |
|---|---|---|---|---|
| Deviation<br>Location | 0.5 Dot<br>(0.175°) | 1 Dot<br>(0.35°) | 1.5 Dot<br>(0.525°) | 2 Dot<br>(0.7°) |
| Threshold | 3.06 ft | 6.11 ft | 9.17 ft | 12.22 ft |
| 7 NM | 132.97 ft | 265.94 ft | 398.91 ft | 531.88 ft |

| Lateral Deviations | | | | |
|---|---|---|---|---|
| Deviation Location | 0.5 Dot (0.625°) | 1 Dot (1.25°) | 1.5 Dots (1.875°) | 2 Dots (2.5°) |
| Threshold | 87.50 ft | 175.00 ft | 262.50 ft | 350.00 ft |
| 7 NM | 551.75 ft | 1103.50 ft | 1655.25 ft | 2207.00 ft |

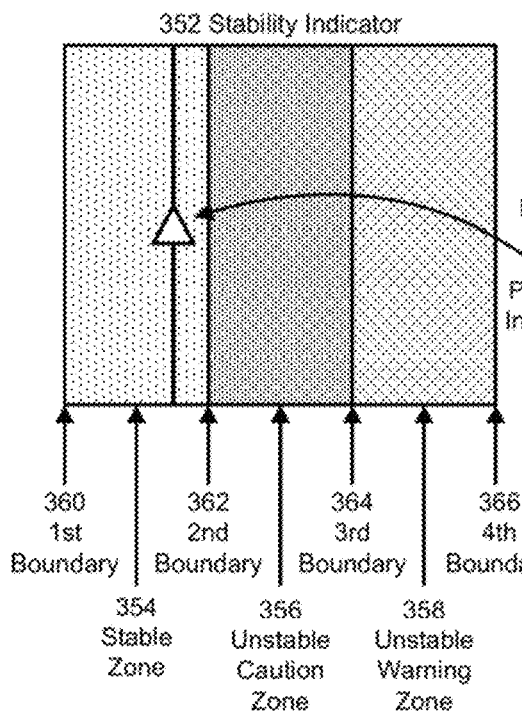
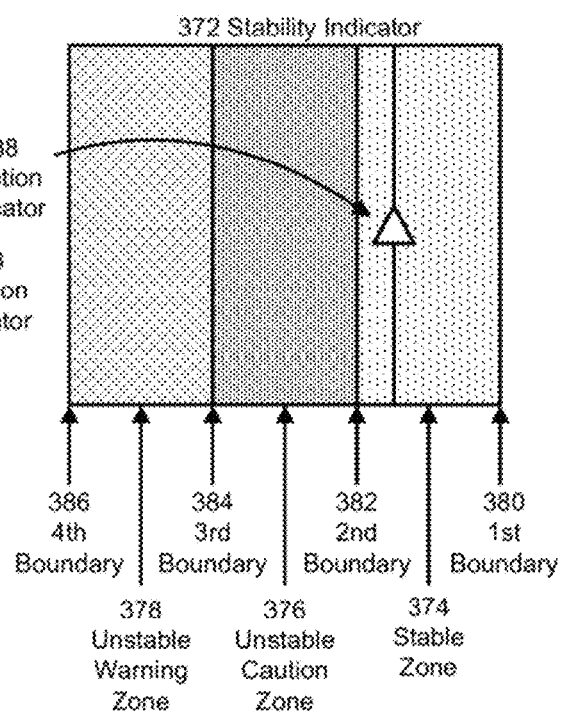
FIG. 7A
FIG. 8A
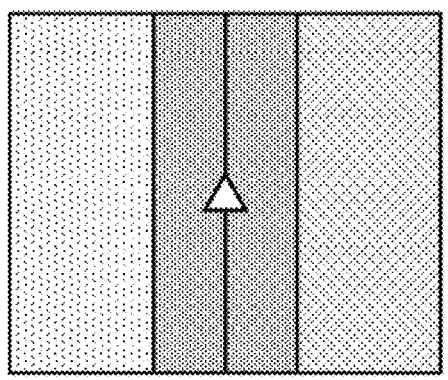
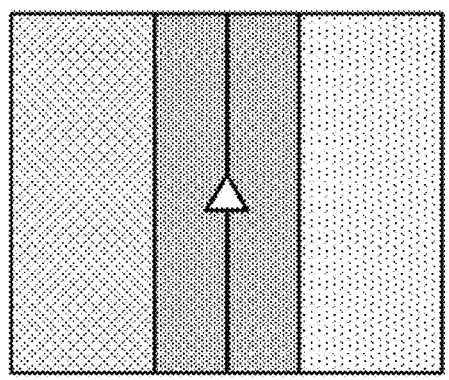
FIG. 7B
FIG. 8B
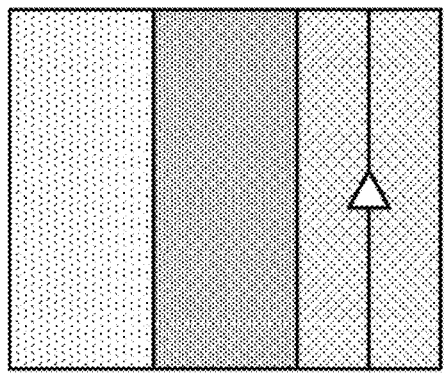
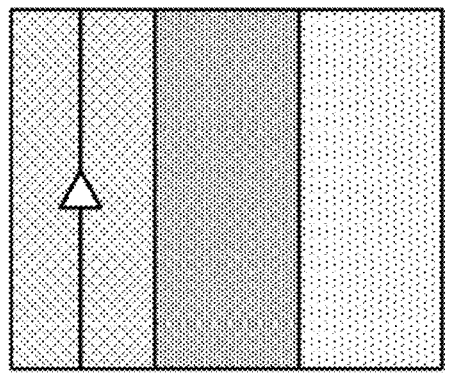
FIG. 7C
FIG. 8C

FLIGHT PHASE STABILITY INDICATOR SYSTEM AND METHOD

BACKGROUND OF THE INVENTION

Field of the Invention

This invention pertains generally to the field of indicating systems such as, but not limited to, aircraft indicating systems.

Description of the Related Art

Runway overruns and underruns have been recognized as major contributors to aviation accidents worldwide. Current warnings systems such as the industry standard employed for a Ground Proximity Warnings System (GPWS), Terrain Awareness and Warning System (TAWS), and surface management systems do not address all of the problems; this was evidenced by an accident involving of an Asiana Airlines Boeing 777-200ER at San Francisco International Airport in July 2013. A shortcoming of these systems is the deliberate "detuning" of the alerting algorithms when operating near airports so that nuisance alerts are inhibited because of deliberate "low and slow" flight operations when an aircraft approaches a runway.

The accident was attributed to pilot error. The pilots were operating the aircraft on autopilot and disengaged it eighty-three seconds prior to the landing. Although they assumed control of the aircraft upon disengagement, they failed to manually engage the throttles, thereby creating an unstable flight mode for an aircraft operating in the approach and/or landing operational flight modes. As a result of the accident, passengers were killed and injured.

BRIEF SUMMARY OF THE INVENTION

Embodiments of the inventive concepts disclosed herein are directed to a flight phase stability indicator system and method for generating and presenting stability indicator(s). The inventive concepts disclosed herein could enhance a pilot's situational awareness of the current operational flight phase by monitoring and presenting him or her with instant stability information of the current operational flight phase both textually and graphically with the disclosed stability indicator comprised of a plurality of traversable stability zones and a traversing position indicator. The use of real-time input factors applied to a projected trajectory to provide the pilot(s) with a way to visually monitor the progress of an approach-to-landing on runway by providing real-time advisories including those advisories meeting criteria for the generation of caution and warning stability indications as well as a time to recover from such indications.

In one aspect, embodiments of the inventive concepts disclosed herein are directed to a flight phase stability indicator for presenting a stability level for the flight phase. This indicator may be comprised of a plurality of stability zones and a position indicator traversable across the plurality of stability zones and having an instant position referenced to an aircraft position and a planned trajectory.

In a further aspect, embodiments of the inventive concepts disclosed herein are directed to a system for generating the flight phase stability indicator for presenting a stability level for the flight phase. This system may include a source of operational flight phase data, a source of navigation data, and a processor for generating presentation data representative of a flight phase stability indicator.

In another embodiment, a method for generating operational mode stability data comprised of stability advisory data is disclosed, where the method could be performed by the processor. In a further aspect, embodiments of the inventive concepts disclosed herein are directed to a method for generating the flight phase stability indicator for presenting a stability level for the flight phase. When properly configured, the processor may receive the flight phase data; receive the navigation data representative of at least aircraft position, a planned trajectory, and if runway data is needed for the current operational flight phase, runway data; determine stability data; and generate the presentation data responsive to the determination of stability data.

BRIEF DESCRIPTION OF THE DRAWINGS

FIG. 7A depicts a third stability indicator comprised of a plurality of stability zones and a third traversing position indicator with ownship symbology located inside a stable zone.

FIG. 7B depicts the third traversing position indicator with ownship symbology located within an unstable caution zone.

FIG. 7C depicts the third traversing position indicator with ownship symbology located within an unstable warning zone.

FIG. 8A depicts a fourth stability indicator comprised of a plurality of stability zones and a fourth traversing position indicator with ownship symbology located inside a stable zone.

FIG. 8B depicts the fourth traversing position indicator with ownship symbology located within an unstable caution zone.

FIG. 8C depicts the fourth traversing position indicator with ownship symbology located within an unstable warning zone.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
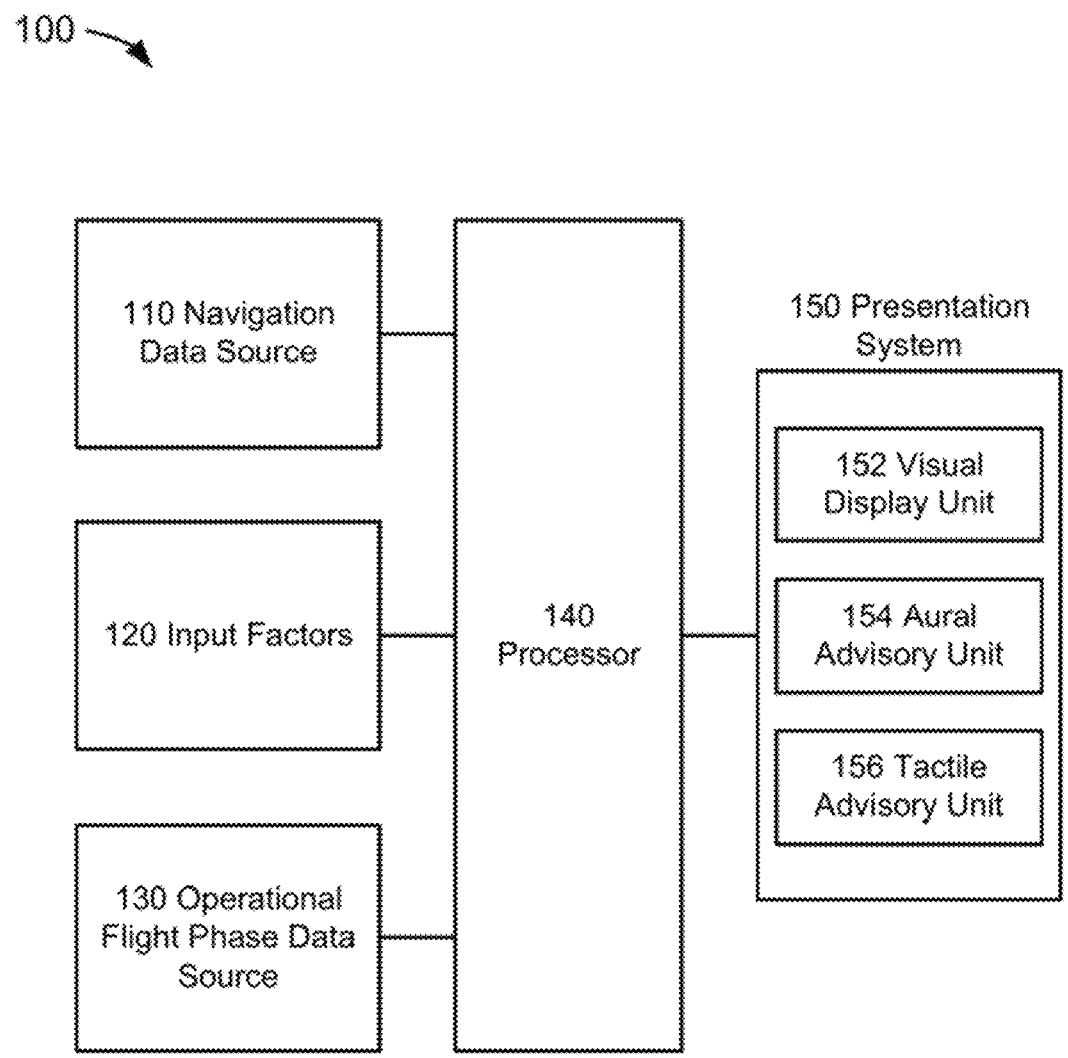
FIG. 1 depicts a functional block diagram of a system for generating operational mode stability data.

FIG. 1 depicts a functional block diagram of a geographic position data generation system 100 suitable for implementation of the techniques described herein. The functional blocks of the system may include a navigation data source 110, input factors 120, an operational flight phase data source 130, a processor 140, and a presentation system 150.

In the embodiment of FIG. 1, the navigation data source 110 could be comprised of a system or systems that may provide navigation data information in an aircraft. A navigation system 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. As embodied herein, aircraft position may be comprised of geographic position (e.g., latitude and longitude coordinates) and altitude, and ground track may be derived from either geographic position, aircraft position, or both. As embodied herein, aircraft orientation may be comprised of pitch, roll, and/or yaw information related to the attitude of the aircraft.

In an embodiment of FIG. 1 the navigation data source 110 could be further comprised of a flight management system ("FMS") which could perform a variety of functions performed to help the crew in the management of the flight; these functions are known to those skilled in the art. These functions could include receiving a flight plan (i.e., planned trajectory) and constructing a lateral and vertical flight plan (i.e., planned lateral and vertical trajectories) from the flight plan. The flight plan could be comprised of a series of waypoints, where each waypoint could include an altitude constraint associated with it. A pilot could create a flight plan by entering waypoints stored in a database or select a flight plan stored in a database of the FMS; also, the flight plan could be received and loaded into the FMS automatically through a data link system known to those skilled in the art.

Also, a flight plan may be modified at any time. A flight plan could be used to guide an aircraft from one position to the next and to compute many flight parameters including, but not limited to, estimated time enroute, estimated time of arrival to a destination airport and/or alternate airport, and estimated fuel consumption between waypoints.

In the performance of its many functions, the FMS could compute a variety of distances and/or surface lengths. Alternatively, such distances and/or lengths could be computed by the pilot and entered into the FMS. The FMS may perform a variety of functions performed to help the crew in the management of the flight, and such functions are known to those skilled in the art. In the performance of its many functions, the FMS may receive navigation data from the navigation data source 110 such as those discussed above.

It should be noted that, as embodied herein for any source or system in an aircraft including the navigation data source 110, data could be comprised of any analog or digital signal, either discrete or continuous, which could contain information or be indicative of information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

Typically, an FMS is comprised of a navigation database that stores data associated with a flight plan such as, but not limited to, published instrument approach procedures, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and global navigation satellite system landing systems. With respect to runway data, information regarding the locating and elevation of a runway's landing threshold point, runway length, and runway width is stored. The navigation database employed by the FMS could be a database described in the following document published by Aeronautical Radio, Incorporated ("ARINC"): ARINC Specification 424 entitled "Navigations Systems Data Base" ("ARINC 424"), an aviation industry standard known to those skilled in the art and which is incorporated by reference herein in its entirety.

It should be noted that aviation industry standards are subject to change. Those skilled in the art appreciate that standards in the aviation industry including, but not limited to, ARINC 424 may be subject to change with future amendments or revisions and/or that other standards related to the subject matter may be adopted. The embodiments disclosed herein are flexible enough to include such future changes and/or adoptions of aviation standards.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, the FMS could compute an optimum speed at each waypoint and aircraft weight and center of gravity. Then, it could compute predictions along the flight path based upon these factors. It could also provide vertical flight information in reference to such predictions. Other miscellaneous performance computations are also made. Computations and underlying algorithms performed by an FMS are known to those skilled in the art.

Lateral elements of a flight plan could include origin airport and runway; a departure procedure that may include, but is not limited to, a standard instrument departure; an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. As embodied herein, the navigation data source 110 could be configured to provide navigation data to the processor 140 for subsequent processing as discussed herein.

In an embodiment of FIG. 1, the input factors 120 may be determining factors which may be employed to define aircraft performance and construct an aircraft performance trajectory. The input factors 120 may be used to define one or more landing distances based upon one or more landing profiles (or landing trajectories) as disclosed in detail below. The input factors 120 may be provided by a plurality of aircraft systems or components thereof. The input factors 120 could include real-time system or sensor data, signal input from a plurality of aircraft systems or sensors, and information from any database or source. A detailed discussion of the input factors 120 and the employment thereof has been disclosed by Chiew et al in U.S. Pat. No. 9,245,450 entitled "System Apparatus, and Method for Generating Runway Visual Aids on an Aircraft Display Unit," which is incorporated by reference herein in its entirety. As embodied herein, the input factors 120 could be configured to provide input factor data to the processor 140 for subsequent processing as discussed herein.

In an embodiment of FIG. 1, the operational flight phase data source 130 may be a source that is determining an instant operational flight phase. Detailed discussions of the operational flight phase source 130 has been disclosed by Carrico in U.S. Pat. No. 8,217,807 entitled "Operational Flight Phase Determination and Indication System" and in U.S. Pat. No. 8,493,240 entitled "System and Method to Automatically Configure an Aircraft for an Operational Flight Phase," both of which are incorporated by reference herein in their entirety. As embodied herein, the operational flight phase data source 130 could be configured to provide operational flight phase data to the processor 140 for subsequent processing as discussed herein.

In an embodiment of FIG. 1, the processor 140 may be comprised of any electronic data processing unit which executes software or computer instruction code that could be stored, permanently or temporarily, in a digital memory storage device or a non-transitory computer-readable media (not depicted herein) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor 140 could also consist of more than one electronic data processing unit. As embodied herein, the processor 140 could be a processor(s) used by or in conjunction with any other system of the aircraft including, but not limited to, the navigation data source 110, the input factors 120, and/or the operational flight phase data source 130. Moreover, the processor 140 could be the processor discussed in the Carrico references and used to perform the method of determining the operational flight phase and to provide operational mode signal(s) to an operational flight phase indicator.

As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus, through a wireless network, or as a signal received and/or transmitted by the processor 140 via a physical or a virtual computer port. The processor 140 may be programmed or configured to execute the method discussed in detail below. The processor 140 may be programmed or configured to provide output data to various systems and/or units including, but not limited to, the presentation system 150.

Figure 5A:
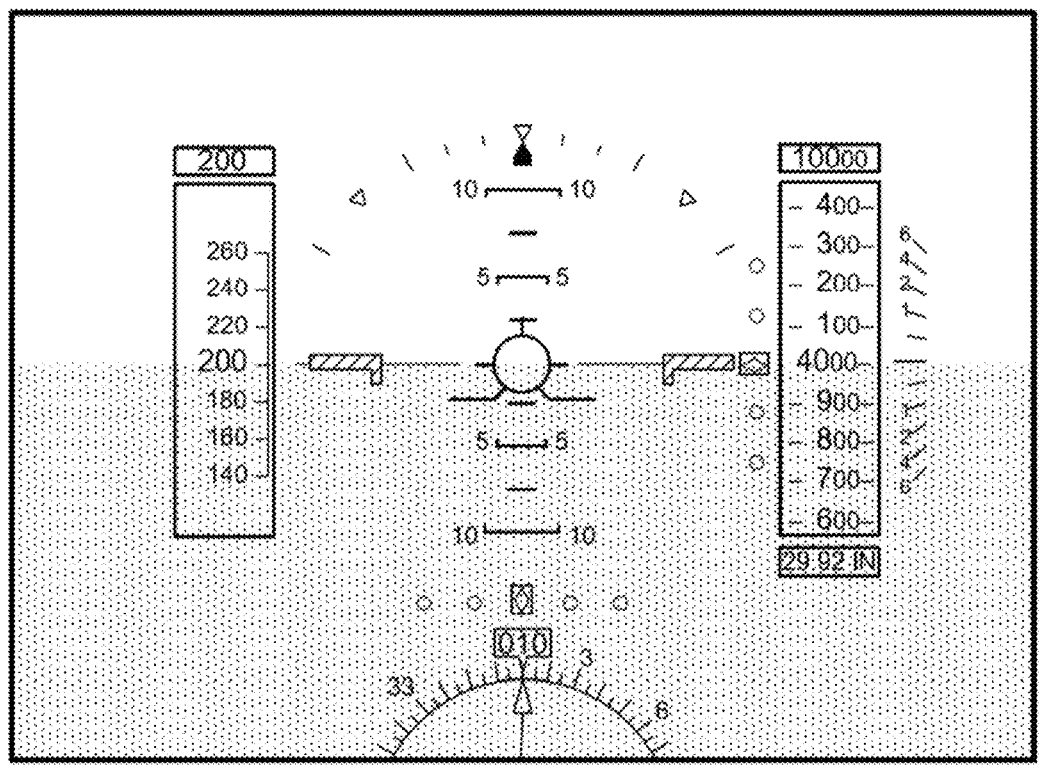
FIG. 5A depicts a visual display unit.
Figure 5B:
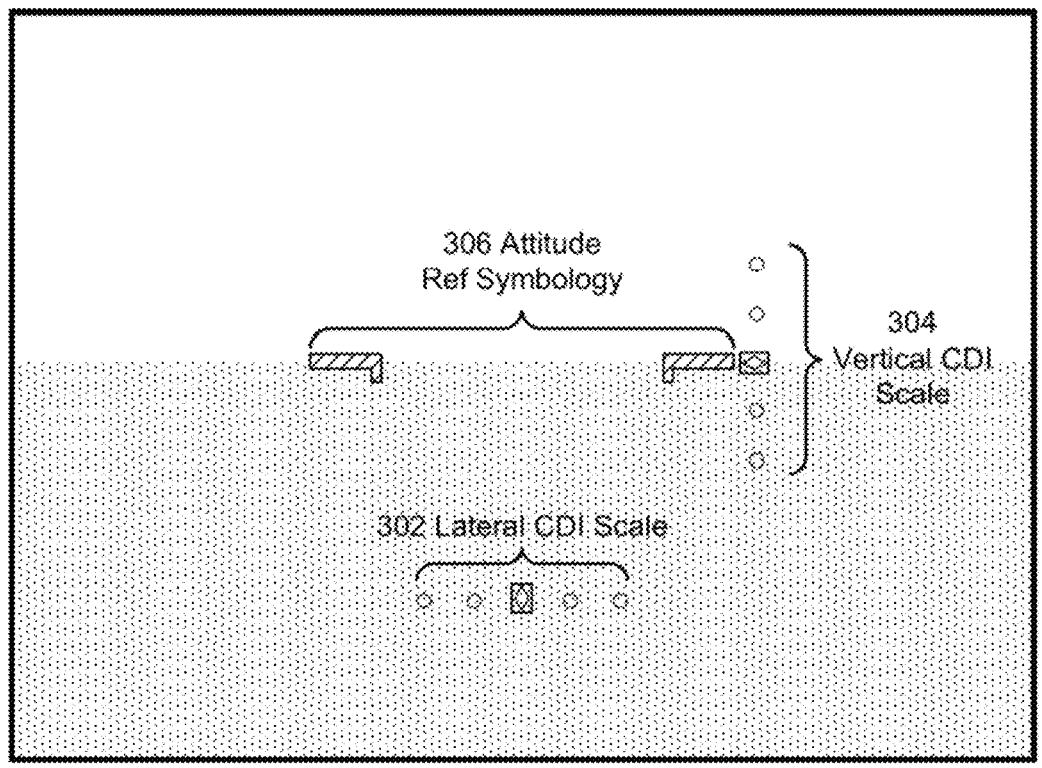
FIG. 5B depicts the visual display unit of FIG. 5A presenting symbologies of a lateral course deviation indicator ("CDI") scale, a vertical CU scale, and an aircraft attitude reference symbology.

In an embodiment of FIG. 1, the presentation system 150 could be comprised of any unit of which visual, aural, and/or tactile indications may be presented to the pilot including, but not limited to, a visual display unit(s) 152, an aural advisory unit 154, and/or a tactile advisory unit 156. The visual display unit 152 (an example of which is shown in FIGS. 5A and 5B) could be comprised of any unit of which information may be presented visually to the pilot. The visual display unit 152 could be part of an Electronic Flight Information System ("EFIS") and could be comprised of, but is not limited to, a Primary Flight Display ("PFD"), Navigation Display ("ND"), Head-Up Display ("HUD"), Head-Down Display ("HDD"), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, and tablets), and/or Data Link Control Display Unit. As embodied herein, the visual display unit 152 may include a vision system (not shown) which generates an image data set which represents the image displayed on a display unit. Vision systems include, but are not limited to, a synthetic vision system ("SVS"), an enhanced vision system ("EVS"), and/or a combined SVS-EVS.

The visual display unit 152 could be capable of presenting advisory information which may be information that is projected or displayed on a cockpit display unit to present a condition, situation, or event to the pilot including other display units in addition to the tactical display unit and the strategic display unit. Advisory information may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. As embodied herein, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

In one embodiment, visual advisories could be presented in a textual form including colored text messages such as a green or cyan color to indicate a non-alert, an amber or yellow color when the conditions for a caution alert have been met, or a red color when the conditions for a warning alert have been met. For example, a non-alert text message could present a green or cyan "LANDING OPERATIONAL FLIGHT PHASE" or "STABLE LANDING OPERATIONAL FLIGHT PHASE" when the conditions for neither a caution nor warning alert have been met, an amber or yellow "LANDING OPERATIONAL FLIGHT PHASE" or "UNSTABLE LANDING OPERATIONAL FLIGHT PHASE" when the conditions for a caution alert have been met, and a red "LANDING OPERATIONAL FLIGHT PHASE" or "UNSTABLE LANDING OPERATIONAL FLIGHT PHASE" when the conditions for a warning alert have been met. Moreover, these advisories may be incorporated in the operational flight phase indicator disclosed by Carrico.

In another embodiment, visual alerts could be presented in non-textual forms including, but not limited to, a graphical stability indicator discussed in detail below. In another embodiment, non-textual and textual forms could be displayed in color to indicate the level of threat, e.g., amber or yellow may indicate a caution alert and red may indicate a warning alert. In another embodiment, non-textual and textual forms could remain steady or flash intermittently, where the rate of flashing could represent different levels of operational flight phase stability. Examples using visual alerts are discussed in detail below.

The aural advisory unit 154 may be any unit capable of producing aural advisories. Aural advisories may be discrete sounds, tones, and/or verbal statements used to annunciate a condition, situation, or event. For example, in an embodiment associated with landing operations, an aural advisory could call out "CAUTION—LANDING OPERATIONAL FLIGHT PHASE" or "CAUTION—UNSTABLE LANDING OPERATIONAL FLIGHT PHASE" when the conditions for a caution alert have been met or "WARNING—LANDING OPERATIONAL FLIGHT PHASE" or "WARNING—UNSTABLE LANDING OPERATIONAL FLIGHT PHASE" when the conditions for a warning alert have been met, and either or both could be accompanied with tonal indications. As embodied herein, both caution and warning aural advisories could be presented in combination with or simultaneous to visual alerts and/or tactile advisories.

In an embodiment of FIG. 1, the tactile advisory unit 156 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or tactile advisories. As embodied herein, one or more units of the presentation system 150 may receive an advisory data set provided by processor 140.

Figure 2A:
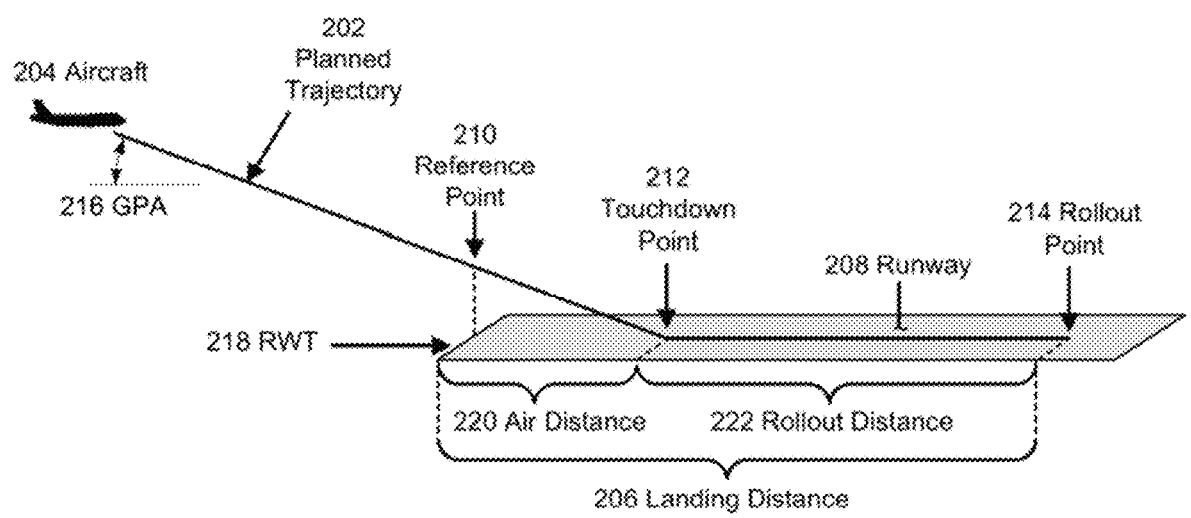
FIG. 2A depicts a planned trajectory of an aircraft.
Figure 6A:
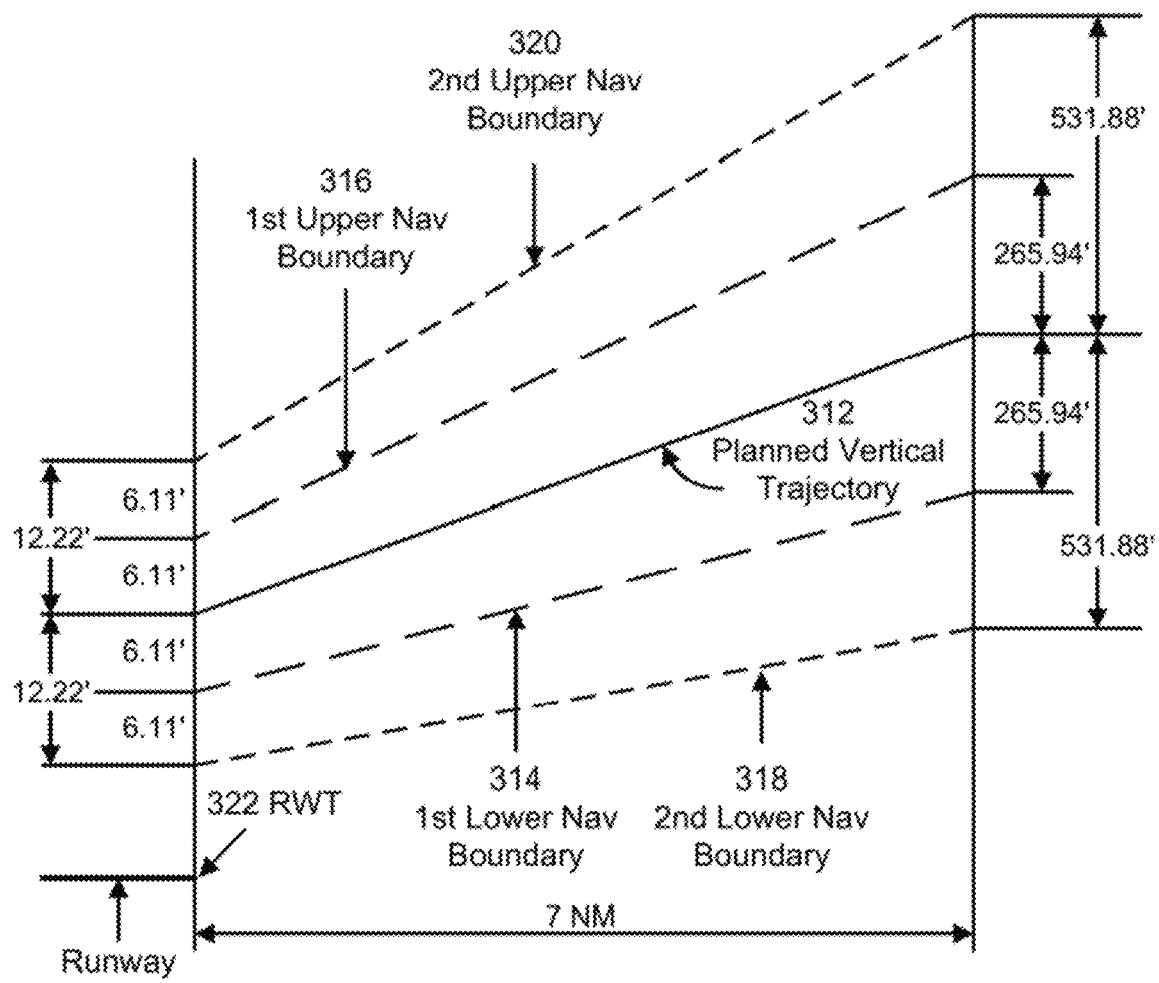
FIG. 6A depicts converging vertical navigation boundaries.

Referring to FIG. 2A, a planned trajectory 202 of an aircraft 204 is depicted from which a landing distance 206 of a runway 208 could be determined. The planned trajectory 202 could comprise a reference point 210, a planned trajectory touchdown point 212, and a rollout point 214. As embodied herein, a point or alert point (discussed below) on a runway is not limited to a point per se but may be designated by a manufacturer or end-user as any area or portion on a runway. The landing distance 206 could be a horizontal distance needed to land as measured between the reference point 210 and the rollout point 214, part of which may be determined as a function of a glide path angle ("GPA") 216 and determined as a function of airspeed, relative winds, aircraft configuration, aircraft weight, and runway surface; the rollout point 214 could be determined as a function of GPA and sink rate. In an embodiment, the reference point 210 could be located above a runway threshold ("RWT") 218 as shown in FIG. 6A. The landing distance 206 could include an air distance 220 plus a rollout distance 222; the air distance 220 could be the horizontal distance required to travel from the reference point 210 to the planned trajectory touchdown point 212, and the rollout distance 222 could be the distance between the planned trajectory touchdown point 212 and the rollout point 214. In one embodiment, the rollout point 214 could be that point where the aircraft arrives at a complete stop through the application of normal braking procedures. In another embodiment, a manufacturer or end-user could configure the rollout point 214 to be some other parameter such as, but not limited to, a safe speed designated for exiting the runway and beginning a transition to a taxi operational flight phase.

Figure 2B:
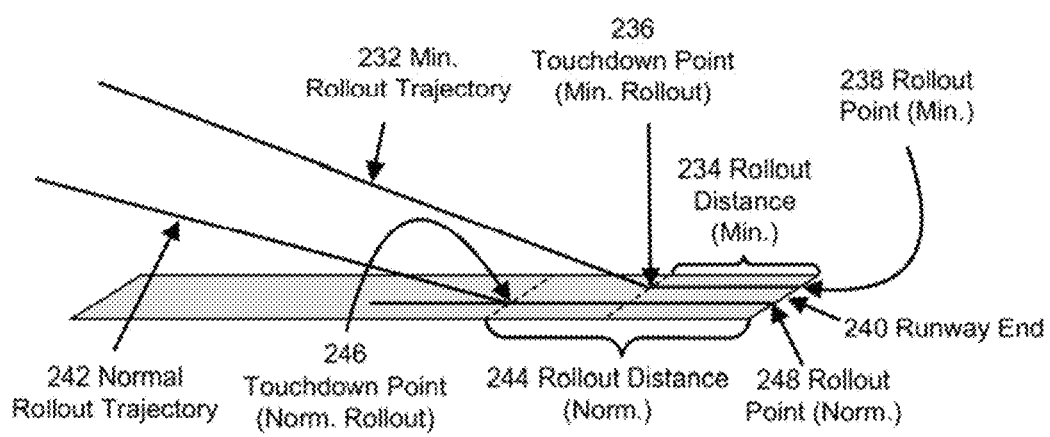
FIG. 2B depicts real-time trajectories of minimum and normal roll-outs of an aircraft.

Referring to FIG. 2B, a real-time minimum rollout trajectory 232 is depicted for a real-time minimum rollout distance 234 has been estimated by applying one or more input factors 120 to aircraft performance algorithm(s) known to those skilled in the art, where the real-time minimum rollout distance 234 may be determined by measuring the distance between a minimum rollout touchdown point 236 and a minimum rollout point 238 that may be located on a runway end 240. For the purpose of estimating the real-time minimum rollout distance 234, an assumption may be made that a pilot will exert a maximum, continuous, and available peak deceleration technique in real-time through an extensive use of operable deceleration systems installed in the aircraft such as, but not limited to, a braking system (which could include an anti-skid system), a spoiler system, and a thrust reversing system, or any combination thereof.

Similarly, a real-time normal rollout trajectory 242 is depicted for a real-time normal rollout distance 244 has been estimated by applying one or more input factors 120 to aircraft performance algorithm(s) known to those skilled in the art, where the real-time normal rollout distance 244 may be determined by measuring the distance between a normal rollout touchdown point 246 and a normal rollout point 248 that may be located on a runway end 240. For the purpose of estimating the real-time normal rollout distance 244, an assumption may be made that a pilot will exert a normal deceleration technique in real-time through a normal use of operable deceleration systems installed in the aircraft.

The advantages and benefits of the embodiments discussed herein may be illustrated by showing examples of how situational awareness of the current operational flight phase could be enhanced with the use of planned and real-time trajectories of FIGS. 2A and 2B. These examples are not intended to provide a limitation to the embodiments discussed herein in any way, shape, or form.

Figure 3A:
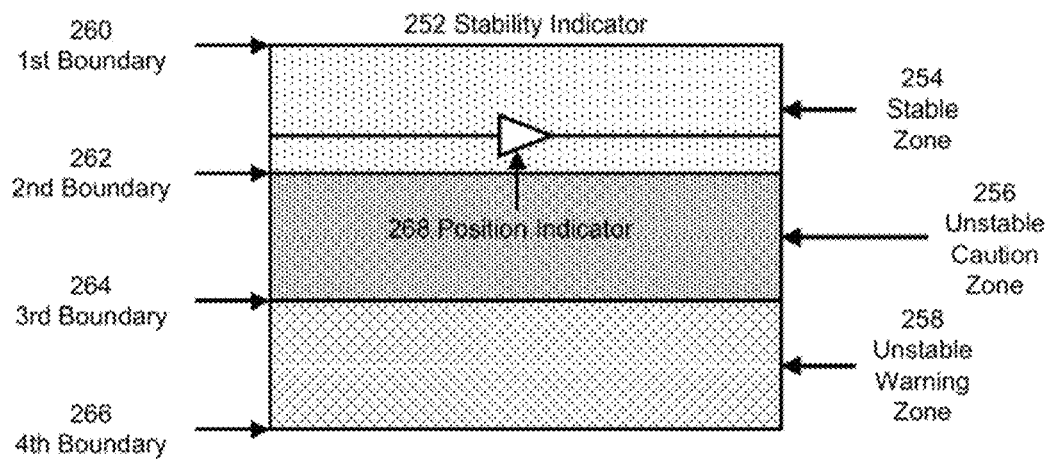
FIG. 3A depicts a stability indicator comprised of a plurality of stability zones and a traversing position indicator with ownship symbology located inside a stable zone.

Referring to FIG. 3A, a stability indicator 252 comprised of a plurality of stability zones, a position indicator, and/or a timer is shown from which the stability of the current operational flight phase could be displayed to the pilot or flight crew. As shown, the plurality of the stability zones is comprised of a stable zone 254, an unstable caution zone 256, and an unstable warning zone 258. The stable zone 254 is comprised of a first boundary 260 and a second boundary 262, representative of a runway zone located in between the normal rollout touchdown point 246 of FIG. 2B and the planned trajectory touchdown point 212 of FIG. 2A, respectively, and indicative of a stable landing operational flight phase. The unstable caution zone 256 is comprised of the second boundary 262 and a third boundary 264, representative of a runway zone located in between the planned trajectory touchdown point 212 and the RWT 218 of FIG. 2A, and indicative of a first, unstable landing operational flight phase. The unstable warning zone 258 is comprised of the third boundary 264 and a fourth boundary 266, representative of a zone located before the RWT 218 of FIG. 2A, and indicative of a second, unstable landing operational flight phase. As embodied herein, the size of each zone could be fixed and proportional to its corresponding runway zone.

Figure 3B:
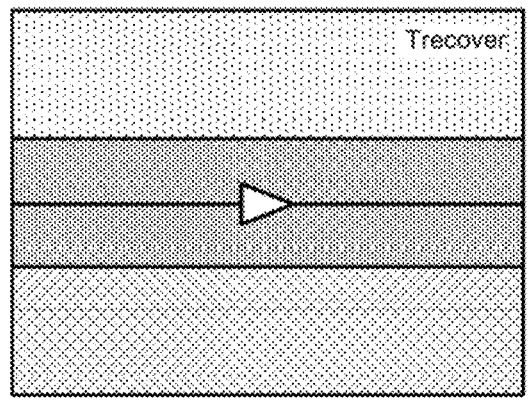
FIG. 3B depicts the traversing position indicator with ownship symbology located within an unstable caution zone.
Figure 3C:
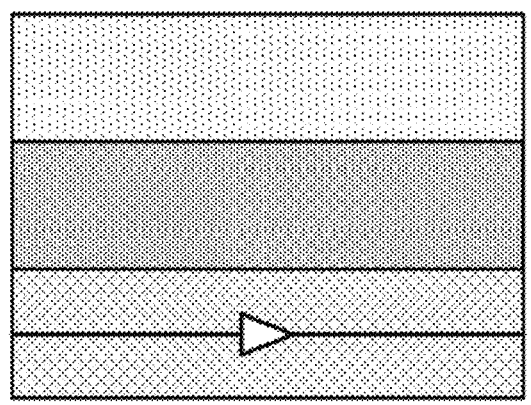
FIG. 3C depicts the traversing position indicator with ownship symbology located within an unstable warning zone.

A position indicator 268 is shown in FIG. 3A. In operation, the position indicator 268 is configured to traverse the three zones of the stability indicator 252, where the instant location of the position indicator 268 could be dependent upon an estimated touchdown point of the actual trajectory being experienced by the aircraft in real-time as determined by applying one or more input factors 120 to aircraft performance algorithm(s). If the estimated touchdown point is located in between the normal rollout touchdown point 246 of FIG. 2B and the planned trajectory touchdown point 212 of FIG. 2A, then the position indicator 268 could be located within the stable zone 254 as shown in FIG. 3A to indicate the existence of a stable landing operational flight phase. If the estimated touchdown point is located in between the planned trajectory touchdown point 212 and the RWT 218 of FIG. 2A, then the position indicator 268 could be located within the unstable caution zone 256 as shown in FIG. 3B to indicate the existence of a first, unstable landing operational flight phase. If the estimated touchdown point is located before the RWT 218 of FIG. 2A, then the position indicator 268 could be located within the unstable warning zone 258 as shown in FIG. 3C to indicate the existence of a second, unstable landing operational flight phase.

Figure 3D:
FIG. 3D depicts a first trend of the traversing position indicator with ownship symbology.
Figure 3E:
FIG. 3E depicts a second trend of the traversing position indicator with ownship symbology.

The position indicator 268 (as well as the position indicators disclosed herein) may also be configured to indicate an instant trend in the stability of the landing operational flight phase. As shown in FIG. 3A, ownship (the triangle shape of the position indicator 268) is pointed to the left; this could indicate the presence of no trend, and that the estimated touchdown point remains at the same point. If the aircraft symbol is pointing downward as shown in FIG. 3D and the position indicator 268 is moving downward, the estimated touchdown point is moving closer to the aircraft; likewise, if the aircraft symbol is pointing upward as shown in FIG. 3E and the position indicator 268 is moving upward, the estimated touchdown point is moving away from the aircraft.

Returning to FIG. 3B, a safety threshold time "Trecover" (e.g., "time to recover") is shown in the top right-hand corner of the stability indicator 252 (although not shown on the other stability indicators presented herein). Through the use of performance algorithms, a manufacturer and/or end-user could include a computed safety threshold time (or an equivalent timer) to indicate to the pilot an estimated amount of time that will be needed to recover the aircraft and re-establish it in the stable zone if proper recovery procedures are employed immediately. As embodied herein, a manufacturer and/or end-user could make the display of the safety threshold time optional if the aircraft is operating within the stable zone.

Figure 4A:
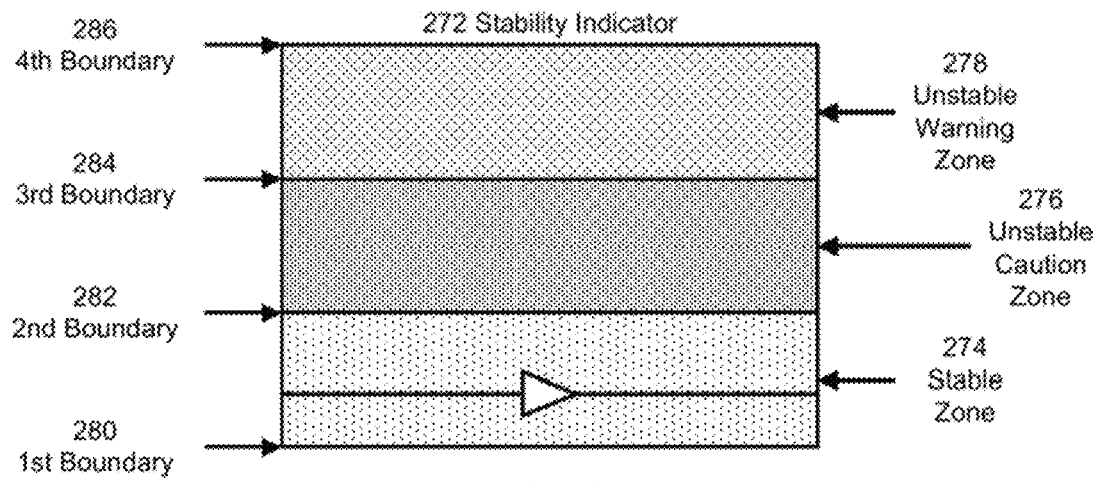
FIG. 4A depicts a second stability indicator comprised of a plurality of stability zones and a second traversing position indicator with ownship symbology located inside a stable zone.

Referring to FIG. 4A, a second stability indicator 272 comprised of a plurality of stability zones and ownship symbology is shown from which the stability of the current operational flight phase could be displayed to the pilot or flight crew. As shown, the plurality of the stability zones is comprised of a stable zone 274, an unstable caution zone 276, and an unstable warning zone 278. The stable zone 274 is comprised of a first boundary 280 and a second boundary 282, representative of a runway zone located in between the planned trajectory touchdown point 212 of FIG. 2A and the normal rollout touchdown point 246 of FIG. 2B, respectively, and indicative of a stable landing operational flight phase. The unstable caution zone 276 is comprised of the second boundary 282 and a third boundary 284, representative of a runway zone located in between the normal rollout touchdown point 246 and the minimum rollout touchdown point 236 of FIG. 2B, and indicative of a first, unstable landing operational flight phase. The unstable warning zone 278 is comprised of the third boundary 284 and a fourth boundary 286, representative of a runway zone located beyond the minimum rollout touchdown point 236 of FIG. 2B, and indicative of a second, unstable landing operational flight phase.

Figure 4B:
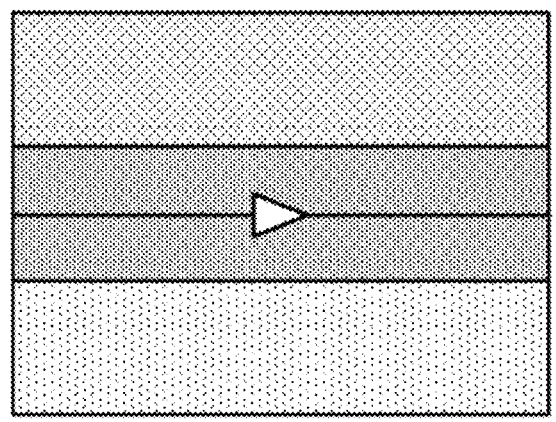
FIG. 4B depicts the second traversing position indicator with ownship symbology located within an unstable caution zone.
Figure 4C:
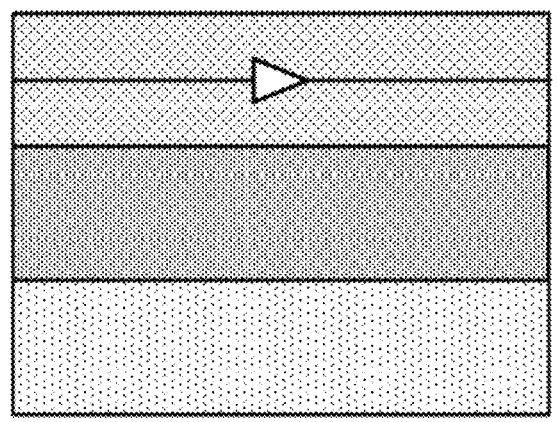
FIG. 4C depicts the second traversing position indicator with ownship symbology located within an unstable warning zone.

If the estimated touchdown point is located in between the planned trajectory touchdown point 212 of FIG. 2A and the normal rollout touchdown point 246 of FIG. 2B, then the position indicator 268 could be located within the stable zone 274 as shown in FIG. 4A to indicate the existence of a stable landing operational flight phase. If the estimated touchdown point is located in between the normal rollout touchdown point 246 and the minimum rollout touchdown point 236 of FIG. 2B, then the position indicator 268 could be located within the unstable caution zone 276 as shown in FIG. 4B to indicate the existence of a first, unstable landing operational flight phase. If the estimated touchdown point is located beyond the minimum rollout touchdown point 236 of FIG. 2B, then the position indicator 268 could be located within the unstable warning zone 278 as shown in FIG. 4C to indicate the existence of a second, unstable landing operational flight phase.

It should be noted that either stability indicator 252 or stability indicator 272 may be shown at one time. Should the position indicator 268 of FIG. 3A trend upward and approach the first boundary 260 as it traverses the stable zone 254, the indication could switch to the stability indicator 272 of FIG. 4A to continue its traversal of the stable zone 274 upward, and vice versa. Alternatively, the position indicators 252 and 272 could be combined to form one stability indicator with one stable zone, where the position indicator 252 could be located under the position indicator 272.

Besides the monitoring of landing operational flight phase stability by determining a plurality of trajectories and touchdown points, monitoring could also be achieved by determining angular course deviations from the GPA of a planned trajectory. Referring to FIG. 5A, a visual display unit (an exemplar of the visual display unit 152) depicting a "blue/brown" electronic attitude indicator used in classic electronic PFDs is shown.

As indicated in FIG. 5B, the symbologies of a lateral course deviation indicator ("CDI") scale 302, a vertical CDI scale 304, and an aircraft attitude reference symbology 306 have been isolated from the other flight symbologies shown in FIG. 5A. The lateral CDI scale 302 is shown as a lateral arrangement comprised of a rectangle and a scale, where such scale is comprised of a diamond and four "dots" (illustrated as four hollow circles). The rectangle represents the planned lateral trajectory, the diamond represents the reference point from which lateral deviation can be measured, and the dots indicate directional and numerical measurements of lateral deviation between the planned lateral trajectory and the current aircraft position. When viewed by the pilot, the rectangle moves along the stationary scale in response to the aircraft's measured change in deviation from the planned lateral trajectory.

Similarly, the vertical CDI scale 304 is shown as a vertical arrangement comprised of a rectangle and a scale, where such scale is comprised of a diamond and four dots. The rectangle represents the planned vertical trajectory, the diamond represents the reference point from which vertical deviation can be measured, and the dots indicate directional and numerical measurements of vertical deviation between the planned vertical trajectory and the current aircraft position. When viewed by the pilot, the rectangle moves along the stationary scale in response to the aircraft's measured change in deviation from the planned vertical trajectory.

The rectangle of the lateral CDI scale 302 provides the pilot with the directional measurement of lateral deviation by moving left or right of the diamond in response to changes in deviation, and the rectangle of the vertical CDI scale 304 provides the pilot with the directional measurement of vertical deviation by moving up or down of the diamond in response to changes in vertical deviation. Those skilled in the art recognize the rectangles as providing the same functionality as CDI needles integrated in many classic analog indicators, where the needles swung or moved across the dots.

As shown, the rectangle and diamond of each scale coincide with one another, thereby indicating to the pilot that the aircraft is on the trajectory laterally and vertically; in other words, there is no lateral or vertical deviation from the planned trajectory. If there is deviation, the rectangle and diamond will not coincide with one another. If the aircraft is right of the planned lateral trajectory, the rectangle will be located to the left of the diamond on the lateral CDI scale; if the aircraft is left, the rectangle will be located to the right of the diamond. Similarly, if the aircraft is above the planned vertical trajectory, the rectangle will be located below the diamond on the vertical CDI scale; if the aircraft is below, the rectangle will be located above the diamond.

In addition to directional measurements, the dots provide the pilot with the ability to numerically measure the aircraft's deviation from the planned trajectory. Each dot corresponds to the measurement between the planned trajectory and a defined navigation boundary of the planned trajectory; it should be noted that the dots do not represent the boundaries. For the purpose of illustration only, the dimensions of an exemplar ILS illustrated in FIGS. 6A and 6B will be used to define navigation boundaries of the planned trajectory. It should be noted, however, permit a manufacturer and/or end-user flexibility in defining such boundaries (both lateral and vertical) where such boundaries could be configured with fixed or variable boundaries dependent upon one or more parameters such as, but not limited to, ground speed, glide path angle, air mass, start and end points, descent path, descent rate, As illustrated in FIG. 6A, the first dot above or below the diamond shown on the vertical CDI scale 304 indicates the measurement between the planned vertical trajectory 312 and a first lower navigation boundary 314 or a first upper navigation boundary 316, respectively, where each boundary corresponds to a 0.35 degree deviation from the planned vertical trajectory 312. The second dot above or below the diamond indicates the measurement between the planned vertical trajectory 312 and a second lower navigation boundary 318 or a second higher navigation boundary 320, respectively, where each boundary corresponds to a 0.70 degree deviation from the planned vertical trajectory 312.

Because the vertical boundaries are typically comprised of straight lines in an ILS, the amount of variation is linearly proportional and may be determined from any fixed reference point which has been assumed to be a RWT 322 of the runway. At the RWT 322, the first and second dots on each side of the diamond on the vertical CDI scale 304 indicate measured deviations of approximately 6.11 feet and 12.22 feet, respectively. At a distance of 7 NM from the RWT 322, the first and second dots on each side of the diamond indicate measured deviations of approximately 265.94 feet and 531.88 feet, respectively.

Figure 6B:
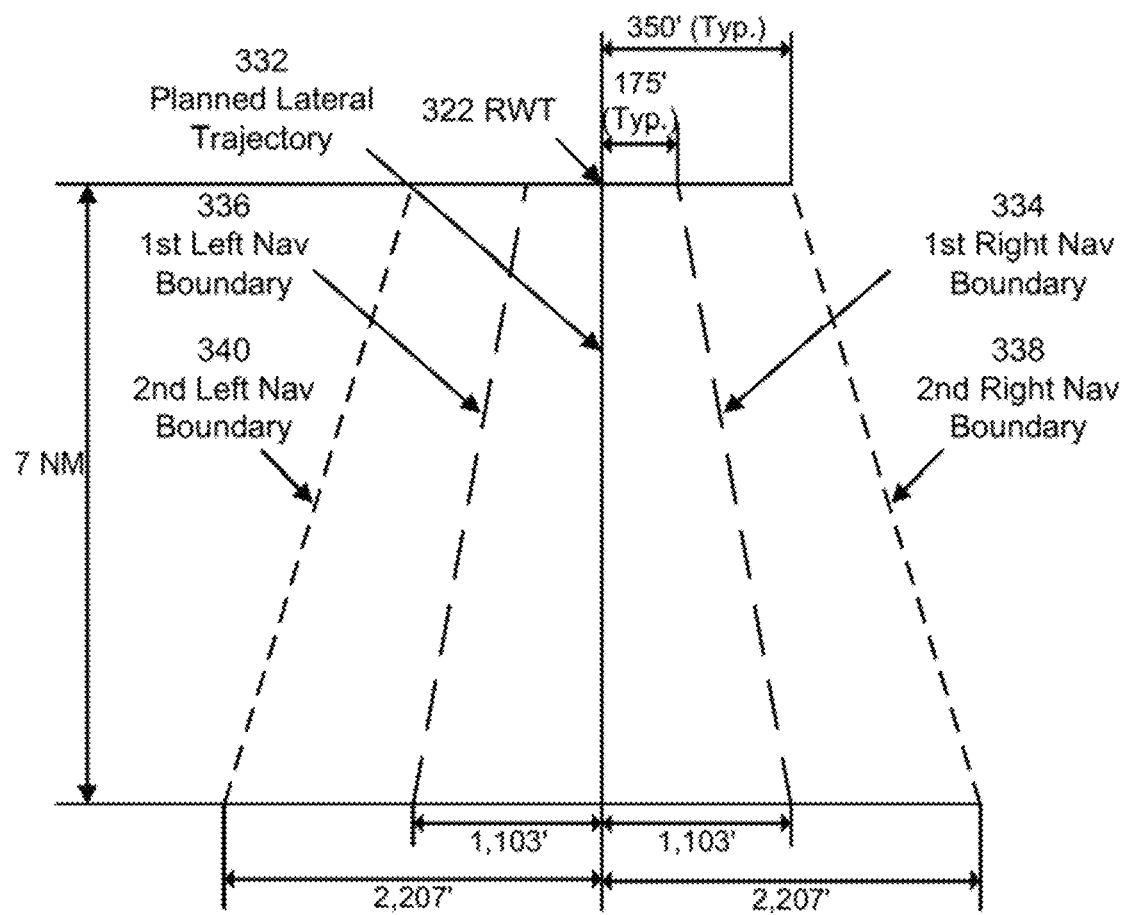
FIG. 6B depicts converging lateral navigation boundaries.

Similarly, as illustrated in FIG. 6B, the first dot to the left or right of the diamond shown on the lateral CDI scale 302 indicates the measurement between the planned lateral trajectory 332 and a first right navigation boundary 334 or a first left navigation boundary 336, respectively, where each boundary corresponds to a 1.25 degree deviation from the planned lateral trajectory 332. The second dot to the left or right of the diamond indicates the measurement between the planned lateral trajectory 332 and a second right navigation boundary 338 or a second left navigation boundary 340, respectively, where each boundary corresponds to a 2.5 degrees deviation from the planned lateral trajectory 332.

Because the lateral boundaries are typically comprised of straight lines in an ILS, the amount of variation is linearly proportional and may be determined from any fixed reference point which is assumed to be the RWT 322 of FIG. 6A. At the RWT 322 of FIG. 6B, the first and second dots on each side of the diamond on the lateral CDI scale 302 indicate measured deviations of 175 feet and 350 feet, respectively. At a distance of 7 nautical miles ("NM") from the RWT 322, the first and second dots on each side of the diamond indicate measured deviations of approximately 1,103 feet and 2,207 feet, respectively.

The vertical and lateral boundaries may be used to define the plurality of stability zones of the stability indicators 252 and 272. Returning to FIG. 3A, the first boundary 260 and the second boundary 262 of the stable zone 254 may be representative of an approach zone located in between the first upper navigation boundary 316 and the first lower navigation boundary 314, respectively, and indicative of a stable landing operational flight phase. The second boundary 262 and the third boundary 264 of the unstable caution zone 256 may be representative of an approach zone located in between the first lower navigation boundary 314 and the second lower navigation boundary 318, and indicative of a first, unstable landing operational flight phase. The third boundary 264 and the fourth boundary 266 of the unstable warning zone 258 may be comprised of an approach zone located below the second lower navigation boundary 318, and indicative of a second, unstable landing operational flight phase. As embodied herein, the size of each zone could be fixed and proportional to its corresponding approach zone.

If the position of the aircraft is located in between the first lower navigation boundary 314 and the first upper navigation boundary 316, then the position indicator 268 could be located within the stable zone 254 as shown in FIG. 3A to indicate the existence of a stable landing operational flight phase. If the position of the aircraft is located in between the first lower navigation boundary 314 and the second lower navigation boundary 318, then the position indicator 268 could be located within the unstable caution zone 256 as shown in FIG. 3B to indicate the existence of a first, unstable landing operational flight phase. If the position of the aircraft is located below the second lower navigation boundary 318, then the position indicator 268 could be located within the unstable warning zone 258 as shown in FIG. 3C to indicate the existence of a second, unstable landing operational flight phase.

Returning to FIG. 4A, the first boundary 280 and the second boundary 282 of the stable zone 274 may be representative of an approach zone located in between the first lower navigation boundary 314 and the first upper navigation boundary 316, respectively, and indicative of a stable landing operational flight phase. The second boundary 282 and the third boundary 284 of the unstable caution zone 276 may be representative of an approach zone located in between the first upper navigation boundary 316 and the second upper navigation boundary 320, and indicative of a first, unstable landing operational flight phase. The third boundary 284 and the fourth boundary 286 of the unstable warning zone 278 may be comprised of an approach zone located above the second upper navigation boundary 320, and indicative of a second, unstable landing operational flight phase.

If the position of the aircraft is located in between the first lower navigation boundary 314 and the first upper navigation boundary 316, then the position indicator 268 could be located within the stable zone 274 as shown in FIG. 4A to indicate the existence of a stable landing operational flight phase. If the position of the aircraft is located in between the first upper navigation boundary 316 and the second upper navigation boundary 320, then the position indicator 268 could be located within the unstable caution zone 276 as shown in FIG. 4B to indicate the existence of a first, unstable landing operational flight phase. If the position of the aircraft is located above the second upper navigation boundary 320, then the position indicator 268 could be located within the unstable warning zone 278 as shown in FIG. 4C to indicate the existence of a second, unstable landing operational flight phase.

Referring to FIG. 7A, a stability indicator 352 comprised of a plurality of stability zones and a position indicator is shown. The plurality of the stability zones is comprised of a stable zone 354, an unstable caution zone 356, and an unstable warning zone 358. The stable zone 354 is comprised of a first boundary 360 and a second boundary 362, representative of an approach zone located in between the first left navigational boundary 336 and the first right navigational boundary 334, respectively, and indicative of a stable landing operational flight phase. The unstable caution zone 356 is comprised of the second boundary 362 and a third boundary 364, representative of an approach zone located in between the first right navigational boundary 334 and the second right navigational boundary 338, and indicative of a first, unstable landing operational flight phase. The unstable warning zone 258 is comprised of the third boundary 364 and a fourth boundary 366, representative of an approach zone located to the right of the second right navigational boundary 338, and indicative of a second, unstable landing operational flight phase.

If the position of the aircraft is located in between the first left navigation boundary 336 and the first right navigation boundary 334, then the position indicator 368 could be located within the stable zone 354 as shown in FIG. 7A to indicate the existence of a stable landing operational flight phase. If the position of the aircraft is located in between the first right navigation boundary 334 and the second right navigation boundary 338, then the position indicator 368 could be located within the unstable caution zone 356 as shown in FIG. 7B to indicate the existence of a first, unstable landing operational flight phase. If the position of the aircraft is located to the right of the second right navigation boundary 338, then the position indicator 368 could be located within the unstable warning zone 358 as shown in FIG. 7C to indicate the existence of a second, unstable landing operational flight phase.

Referring to FIG. 8A, a stability indicator 372 comprised of a plurality of stability zones and a position indicator is shown. The plurality of the stability zones is comprised of a stable zone 374, an unstable caution zone 376, and an unstable warning zone 378. The stable zone 374 is comprised of a first boundary 380 and a second boundary 382, representative of an approach zone located in between the first right navigational boundary 334 and the first left navigational boundary 336, respectively, and indicative of a stable landing operational flight phase. The unstable caution zone 376 is comprised of the second boundary 382 and a third boundary 384, representative of an approach zone located in between the first left navigational boundary 336 and the second left navigational boundary 340, and indicative of a first, unstable landing operational flight phase. The unstable warning zone 378 is comprised of the third boundary 384 and a fourth boundary 386, representative of an approach zone located to the left of the second left navigational boundary 340, and indicative of a second, unstable landing operational flight phase.

If the position of the aircraft is located in between the first left navigation boundary 336 and the first right navigation boundary 334, then the position indicator 388 could be located within the stable zone 374 as shown in FIG. 8A to indicate the existence of a stable landing operational flight phase. If the position of the aircraft is located in between the first left navigation boundary 336 and the second left navigation boundary 340, then the position indicator 388 could be located within the unstable caution zone 376 as shown in FIG. 8B to indicate the existence of a first, unstable landing operational flight phase. If the position of the aircraft is located to the left of the second left navigation boundary 340, then the position indicator 388 could be located within the unstable warning zone 378 as shown in FIG. 8C to indicate the existence of a second, unstable landing operational flight phase.

Figure 9A:
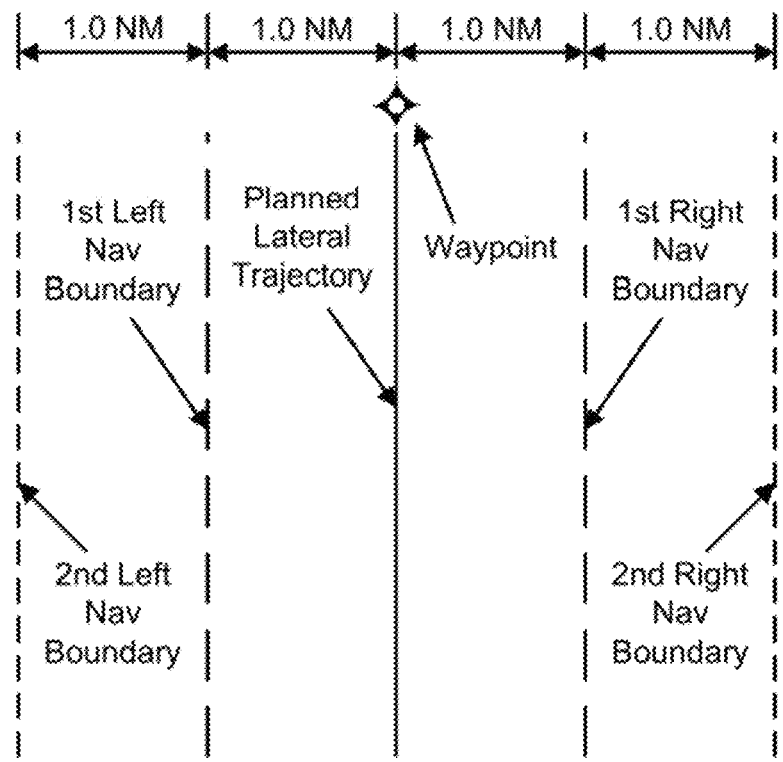
FIG. 9A depicts parallel lateral navigation boundaries.
Figure 9B:
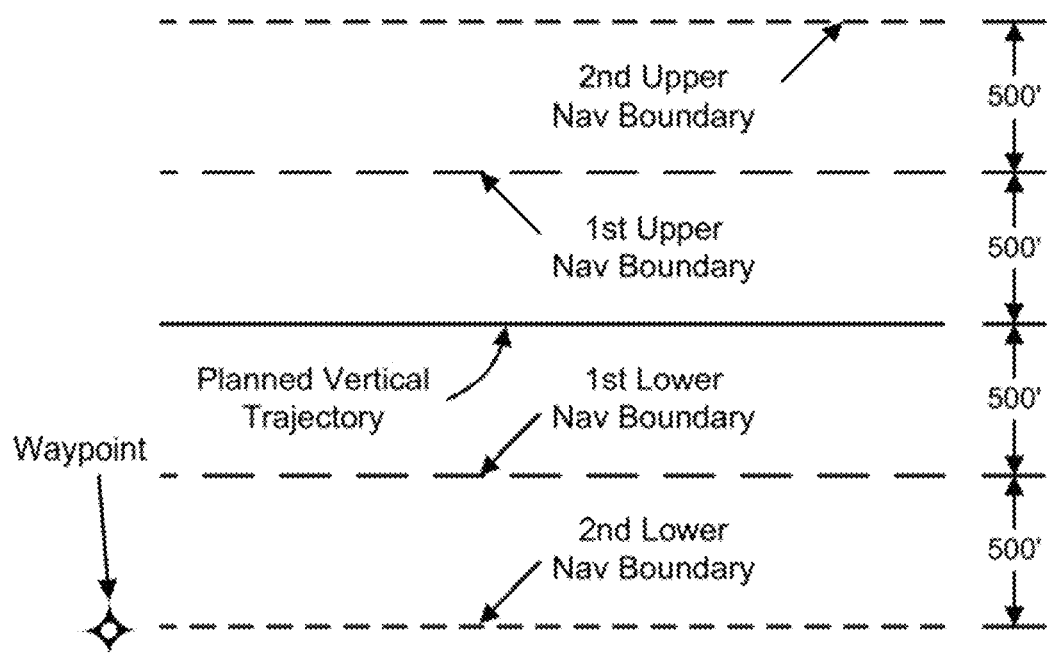
FIG. 9B depicts parallel vertical navigation boundaries.

It should be noted that, although the preceding discussion has been drawn towards a landing operational flight phase (which for the purpose of illustration could include approach and/or roll-out operational flight phases), the embodiments herein are not limited to this operational flight phase. Rather, a manufacturer and/or end-user could adopt references for other operational flight phases. For example, in a cruise operational flight phase where an aircraft operates between a series of waypoints defining a planned trajectory, horizontal and/or vertical parallel boundaries corresponding to the boundaries of a stability indicator. For example, two parallel lateral boundaries evenly spaced at 1.0 nautical miles could be established on both the left and right sides of a planned lateral trajectory as shown in FIG. 9A, and two parallel vertical boundaries evenly spaced at 500 feet could be established above and two below a planned vertical trajectory as shown in FIG. 9B. From these horizontal and/or vertical parallel boundaries, stability zones for a stability indicator may be established in the same or similar manner as discussed above.

Figure 10:
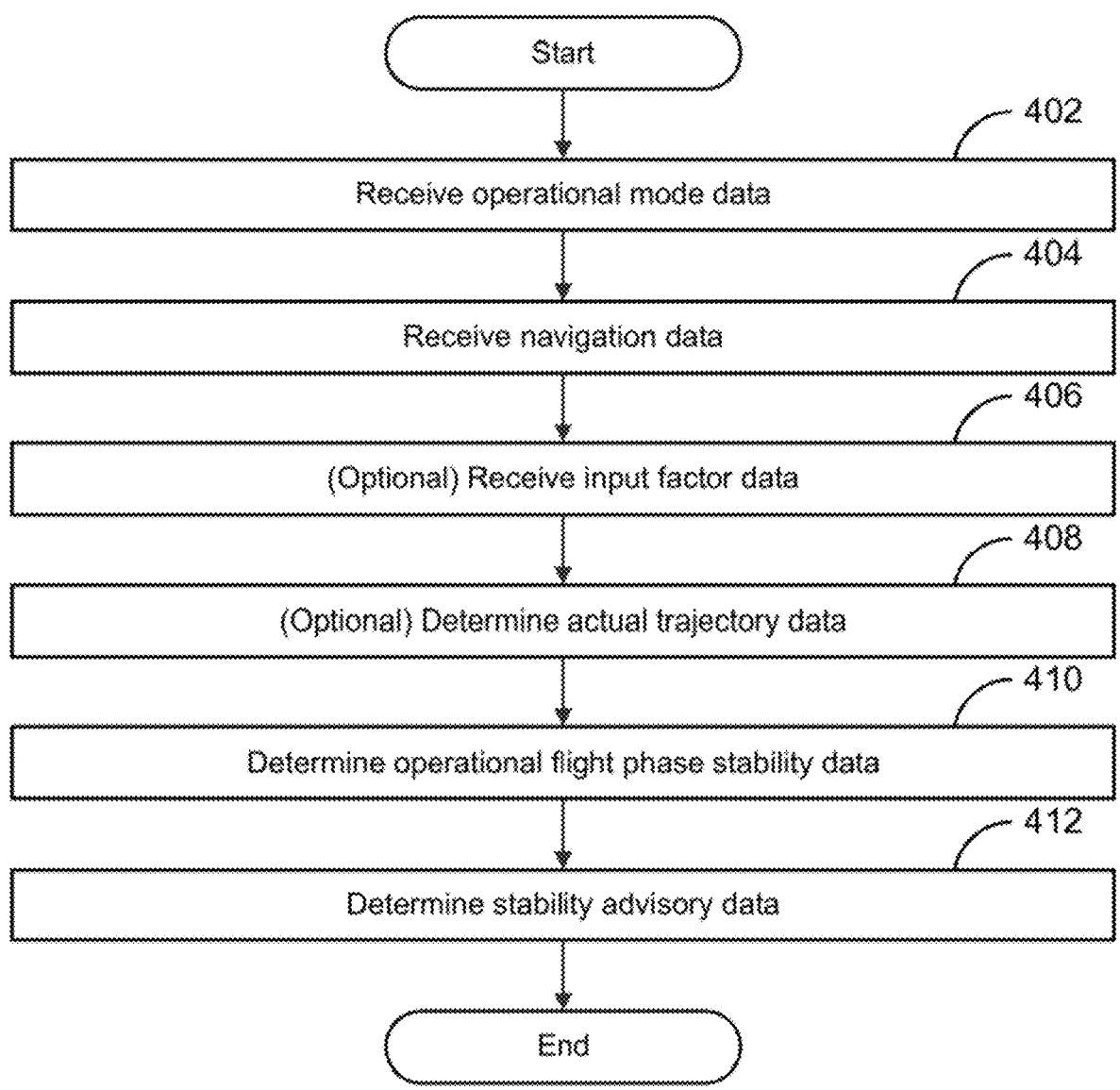
FIG. 10 depicts a flowchart of a method for generating operational mode stability data.

Referring to FIG. 10, flowchart 400 discloses a method for generating operational mode stability data, where the processor 140 may be programmed or configured with instructions corresponding to the modules embodied in the flowchart. As embodied herein, the processor 140 may be a processor or a combination of processors found in the navigation data source 110, the input factors 120, the operational flight phase data source 130, and/or the presentation system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowchart 400, the receiving of data is synonymous and/or interchangeable with the retrieving of data, and the providing of data is synonymous and/or interchangeable with the making available or supplying of data.

Flowchart 400 begins with module 402 with the receiving operational mode data, where such data may be representative of an identification of a current operational flight phase. The operational mode data could be received from the operational flight phase data source 130 within which the processor 140 could be integrated. As embodied herein, the current operation flight phase could be comprised of a combination of an approach operational flight phase and a landing operational flight phase (wherein the latter could include a roll out operational flight phase).

The flowchart continues with module 404 with the receiving of navigation data, where such data may be representative of at least aircraft position and a planned trajectory; additional navigation could include air speed, ground speed, and altitude. Such data could include runway data if the runway data is required during the current operational flight phase. As embodied herein, the planned trajectory could be a defined path of an approach procedure for the runway of intended landing when the aircraft is operating in an approach operational flight phase and/or a landing operational flight phase. Also, the runway data could be data corresponding to a runway of intended landing. In addition, the current operational flight phase requiring the runway data could be comprised of an approach operational flight phase, a landing operational flight phase, or a combination of both.

The flowchart continues with an optional module 406 with the receiving of input factor data, where such data may be representative of one or more input factors as discussed above used for determining a plurality of real-time rollout trajectories and/or stability zones.

The flowchart continues with an optional module 408 with the determining of actual trajectory data. The actual trajectory data may be determined by applying one or more input factors to an aircraft performance algorithm(s), where such algorithm(s) are known to those skilled in the art. As embodied herein, the actual trajectory data could be used to determine an estimated touchdown point.

The flowchart continues with module 410 with the determining of operational stability data. The stability data may be representative of the stability (or a level of stability) of the current operational flight phase based upon at least the navigation data. In one embodiment, the position of the aircraft with respect to navigation boundaries may be determined and used in the determining of the operational stability data. In an optional embodiment, the basis for determining the operational stability data could include the input factor data and actual trajectory data.

The flowchart continues with module 412 with the generating of stability advisory data. The stability advisory data may be representative of an advisory corresponding to the stability of the current operational flight phase. Also, the stability advisory data may be responsive to the determination of the stability data. As embodied herein, the stability advisory data may be comprised of visual advisory data, aural advisory data, and/or tactile advisory data. In an additional embodiment, the stability advisory data may be generated if the stability represented in the stability data is less than stable; in other words, stability of the current operational flight phase could be presumed, such that the presentation of information of stability is enabled only if a stable current operational flight phase does not exist. In another embodiment, the advisory represented in the stability advisory data could be provided to the presentation system 150 and presented visually on the display unit 152, aurally through the aural advisory unit 154, and/or tactilely through the tactile advisory unit 156. In addition, the display unit could be configured to display an operational flight phase indicator as disclosed in Carrico, where the operational flight phase indicator presents the advisory. Then, the flowchart 400 proceeds to the end.

It should be noted that the method steps described above may be embodied in computer-readable media stored in a non-transitory computer-readable medium as computer software. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An aircraft indicator, comprising:
a rectangular indicator of operational flight phase (OFP) stability for a plurality of operational flight phases (OFPs) comprised of:
a plurality of horizontally-disposed or vertically-disposed zones of rectangular, non-overlapping stable and unstable zones, such that
a stable zone is indicative of a stable level of OFP and filled with a first continuously-visible color,
first and second unstable caution zones are indicative of a cautionary level of OFP stability zones and filled with a second continuously-visible color other than the first continuously-visible color,
first and second unstable warning zones are indicative of a warning level of OFP stability and filled with a third continuously-visible color other than the first and second continuously-visible colors,
the first unstable warning zone is contiguous with the first unstable caution zone,
the first unstable caution zone is contiguous with the stable zone,
the stable zone is contiguous with the second unstable caution zone,
the second unstable caution zone is contiguous with the second unstable warning zone, and
the first unstable warning zone and the second unstable warning zone appear within and on opposing sides of the rectangular indicator, where
one operational flight of an aircraft is defined by at least one first ground segment in which the aircraft operates on the ground prior to operating in the air, plurality of flight segments in which the aircraft operates in the air, and at least one second ground segment in which the aircraft operates on the ground after operating in the air,
each one of the first and second ground segments and each one of the plurality of flight segments is defined by one OFP of a plurality OFPs, and
each one of the plurality of OFPs is defined by an operational purpose, where
the aircraft operates in one OFP at a time during the one operational flight, and
the one OFP in which the aircraft is currently operating is identified from at least an OFP data table listing the plurality of OFPs and an aircraft system configuration data table listing at least one defined aircraft system configuration for each one OFP of the plurality of OFPs; and
a position indicator comprised of one straight line having an instant position within the OFP stability indicator referenced to at least latitude, longitude, and a planned trajectory of the aircraft, where
the position indicator includes pointer symbology positioned at one fixed location on the one straight line, such that
the position indicator traverses the horizontally-disposed zones in a horizontal direction or the vertically-disposed zones in a vertical direction without a change of the continuously-visible colors of the horizontally-disposed zones or the vertically-disposed zones to provide a visual cue of one of the three levels of OFP stability in which the aircraft is currently operating to at least one pilot operating the aircraft, and
the pointer symbology points in the direction of the traversal.

2. The aircraft indicator of claim 1, wherein the identification of the one OFP in which the aircraft is currently operating is represented in OFP data provided by a source of OFP data to a processor including at least one processing unit coupled to a non-transitory processor-readable medium storing processor-executable code and configured to generate the OFP stability indicator.

3. The aircraft indicator of claim 1, wherein the rectangular indicator includes a display of numerical characters indicative of an amount of time needed to place the aircraft into the stable level of OFP if not operating in the stable level of the OFP.

4. The aircraft indicator of claim 1, wherein the instant position of the position indicator is further referenced to an actual trajectory.

5. A system for generating an aircraft indicator, comprising:
a source of operational flight phase (OFP) data representative of an identification of one OFP of a plurality of operational flight phases (OFPs), where
one operational flight of an aircraft is defined by at least one first ground segment in which the aircraft operates on the ground prior to operating in the air, a plurality of flight segments in which the aircraft operates in the air, and at least one second ground segment in which the aircraft operates on the ground after operating in the air,
each one of the first and second ground segments and each one of the plurality of flight segments is defined by one OFP of the plurality of OFPs, and
each one of the plurality of OFPs is defined by an operational purpose, where
the aircraft operates in one OFP at a time during the one operational flight, and
the one OFP in which the aircraft is currently operating is determined from at least an OFP data table listing the plurality of OFPs and an aircraft system configuration data table listing at least one defined aircraft system configuration for each one OFP of the plurality of OFPs;
a source of navigation data representative of at least a position and a planned trajectory of the aircraft; and
a processor including at least one processing unit coupled to a non-transitory processor-readable medium storing processor-executable code and configured to:
receive the OFP data;
receive the navigation data;
determine stability data representative of a level of OFP stability of the one identified OFP of the plurality of OFPs based upon at least the navigation data; and
generate presentation data responsive to the determination of the stability data and representative of a rectangular indicator of OFP stability for the plurality of OFPs comprised of:
a plurality of horizontally-disposed or vertically-disposed zones of rectangular, non-overlapping stable and unstable zones, such that
a stable zone is indicative of a stable level of OFP and filled with a first continuously-visible color,
first and second unstable caution zones are indicative of a cautionary level of OFP stability zones and filled with a second continuously-visible color other than the first continuously-visible color,
first and second unstable warning zones are indicative of a warning level of OFP stability and filled with a third continuously-visible color other than the first and second continuously-visible colors,
the first unstable warning zone is contiguous with the first unstable caution zone,
the first unstable caution zone is contiguous with the stable zone,
the stable zone is contiguous with the second unstable caution zone
the second unstable caution zone is contiguous with the second unstable warning zone, and
the first unstable warning zone and the second unstable warning zone appear within and on opposing sides of the rectangular indicator; and
a position indicator comprised of one straight line having an instant position within the OFP stability indicator referenced to at least latitude, longitude, and a planned trajectory of the aircraft, where
the position indicator includes pointer symbology positioned at one fixed location on the one straight line, such that
the position indicator traverses the horizontally-disposed zones in a horizontal direction or the vertically-disposed zones in a vertical direction without a change of the continuously-visible colors of the horizontally-disposed zones or the vertically-disposed zones to provide a visual cue of one of the three levels of OFP stability in which the aircraft is currently operating to at least one pilot operating the aircraft, and
the pointer symbology points in the direction of the traversal.

6. The system of claim 5, wherein the source of OFP data is the processor.

7. The system of claim 5, wherein
the processor has been further configured to:
provide the presentation data to a presentation system configured to receive the presentation data, where the visual OFP stability indicator is presented by at least one display unit of the presentation system.

8. The system of claim 5, wherein
the presentation data is further representative of at least one of an aural presentation of OFP stability and a tactile presentation of OFP stability, where
the aural presentation is presented aurally through an aural advisory unit, and
the tactile presentation is presented tactilely through a tactile advisory unit.

9. The system of claim 5, wherein the indicator includes a display of numerical characters indicative of an amount of time needed to place the aircraft into the stable level of OFP if not operating in the stable level of the OFP.

10. The system of claim 5, wherein
the processor is further configured to:
receive input factor data representative of at least one input factor; and
determine actual trajectory data representative of an actual trajectory as a function of each input factor of the at least one input factor, such that
the basis for determining the stability data includes the actual trajectory data.

11. A method for generating an aircraft indicator, comprising:
receiving, by at least one processing unit coupled to a non-transitory processor-readable medium storing processor-executable code, operational flight phase (OFP) data representative of an identification of one OFP of a plurality of operational flight phases (OFPs), where
one operational flight of an aircraft is defined by at least one first ground segment in which the aircraft operates on the ground prior to operating in the air, a plurality of flight segments in which the aircraft operates in the air, and at least one second ground segment in which the aircraft operates on the ground after operating in the air,
each one of the first and second ground segments and each one of the plurality of flight segments is defined by one OFP of a plurality OFPs, and
each one of the plurality of OFPs is defined by an operational purpose, where
the aircraft operates in one OFP at a time during the one operational flight, and the one OFP in which the aircraft is currently operating is determined from at least an OFP data table listing the plurality of OFPs and an aircraft system configuration data table listing at least one defined aircraft system configuration for each one OFP of the plurality of OFPs;
receiving navigation data representative of at least a position and a planned trajectory of the aircraft;
determining stability data representative of a level of OFP stability of the one identified OFP of the plurality of OFPs based upon at least the navigation data; and
generating presentation data responsive to the determination of the stability data and representative of a rectangular indicator of OFP stability for the plurality of OFPs comprised of:
a plurality of horizontally-disposed or vertically-disposed zones of rectangular, non-overlapping stable and unstable zones, such that
a stable zone is indicative of a stable level of OFP and filled with a first continuously-visible color,
first and second unstable caution zones are indicative of a cautionary level of OFP stability zones and filled with a second continuously-visible color other than the first continuously-visible color,
first and second unstable warning zones are indicative of a warning level of OFP stability and filled with a third continuously-visible color other than the first and second continuously-visible colors,
the first unstable warning zone is contiguous with the first unstable caution zone,
the first unstable caution zone is contiguous with the stable zone,
the stable zone is contiguous with the second unstable caution zone,
the second unstable caution zone is contiguous with the second unstable warning zone, and
the first unstable warning zone and the second unstable warning zone appear within and on opposing sides of the rectangular indicator; and
a position indicator comprised of one straight line having an instant position within the OFP stability indicator referenced to at least latitude, longitude, and a planned trajectory of the aircraft, where
the position indicator includes pointer symbology positioned at one fixed location on the one straight line, such that
the position indicator traverses the horizontally-disposed zones in a horizontal direction or the vertically-disposed zones in a vertical direction without a change of the continuously-visible colors of the horizontally-disposed zones or the vertically-disposed zones to provide a visual cue of one of the three levels of OFP stability in which the aircraft is currently operating to at least one pilot operating the aircraft, and
the pointer symbology points in the direction of the traversal.

12. The method of claim 11, wherein the source of OFP data is the processor.

13. The method of claim 11, further comprising:
providing the presentation data to a presentation system configured to receive the presentation data, where
the visual OFP stability indicator is presented by at least one display unit of the presentation system.

14. The method of claim 11, wherein
the presentation data is further representative of at least one of an aural presentation of OFP stability and a tactile presentation of OFP stability, where
the aural presentation is presented aurally through an aural advisory unit, and
the tactile presentation is presented tactilely through a tactile advisory unit.

15. The method of claim 11, wherein the indicator includes a display of numerical characters indicative of an amount of time needed to place the aircraft into the stable level of OFP if not operating in the stable level of the OFP.

16. The method of claim 11, further comprising:
receiving input factor data representative of at least one input factor; and
determining actual trajectory data representative of an actual trajectory as a function of each input factor of the at least one input factor, such that
the basis for determining the stability data includes the actual trajectory data.

* * * * *